United States Patent [19]
Jerman et al.

[11] Patent Number: 5,358,681
[45] Date of Patent: Oct. 25, 1994

[54] BACKSEAL EXTRUDER

[75] Inventors: Robert E. Jerman, Southampton; Paul J. Raymond, Newtown; Sunil Satija, Holland, all of Pa.

[73] Assignee: Rohm and Haas Company, Philadelphia, Pa.

[21] Appl. No.: 54,736

[22] Filed: Apr. 29, 1993

[51] Int. Cl.$^5$ .................. B29C 47/64; B29C 47/74
[52] U.S. Cl. .................. 264/211.23; 159/2.3; 264/211.24; 264/349; 366/75; 425/146; 425/204; 425/208
[58] Field of Search .............. 264/211.24, 211.23, 264/349, 101; 425/203, 204, 208, 209, 146; 366/75; 159/2.2, 2.3

[56] References Cited

U.S. PATENT DOCUMENTS

| Re. 23,948 | 2/1955 | Fuller | 425/204 |
|---|---|---|---|
| 2,615,199 | 10/1952 | Fuller | |
| 3,085,288 | 4/1963 | Street | 425/204 |
| 3,917,507 | 11/1975 | Skidmore | 264/101 |
| 3,993,292 | 11/1976 | Skidmore | 264/349 |
| 4,073,773 | 2/1978 | Banucci et al. | 264/349 |
| 4,863,363 | 9/1989 | Häring | 425/204 |
| 4,958,006 | 9/1990 | Bernier et al. | 264/211.23 |
| 4,959,186 | 9/1990 | Dollhopf et al. | 425/203 |
| 5,025,044 | 6/1991 | Christell et al. | 523/334 |
| 5,102,958 | 4/1992 | Hous et al. | 525/332.8 |
| 5,205,972 | 4/1993 | Kafka | 264/101 |

FOREIGN PATENT DOCUMENTS

| 0342839 | 11/1989 | European Pat. Off. | 425/376.1 |
|---|---|---|---|
| 2357945 | 5/1975 | Fed. Rep. of Germany | 425/208 |
| 1141054 | 8/1957 | France | 425/376.1 |
| 55-137033 | 10/1980 | Japan | 425/204 |
| 60-259426 | 12/1985 | Japan | 425/208 |
| 927501 | 5/1963 | United Kingdom | 425/204 |

Primary Examiner—Jeffery Thurlow
Attorney, Agent, or Firm—Jordan J. Driks

[57] ABSTRACT

An extruder having a reduced nip ratio and a process employing the same.

9 Claims, 2 Drawing Sheets

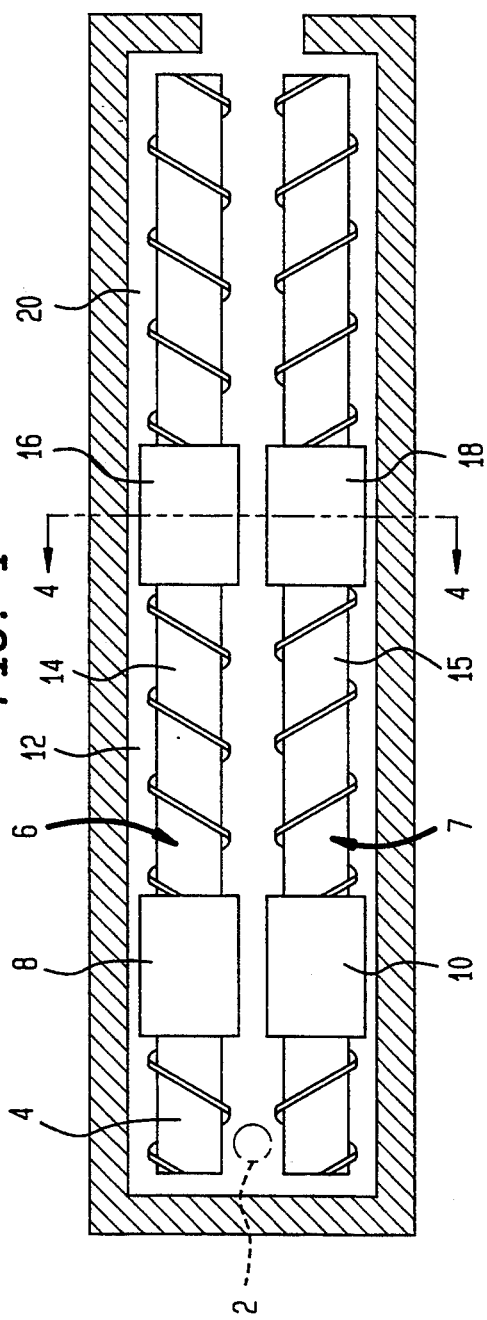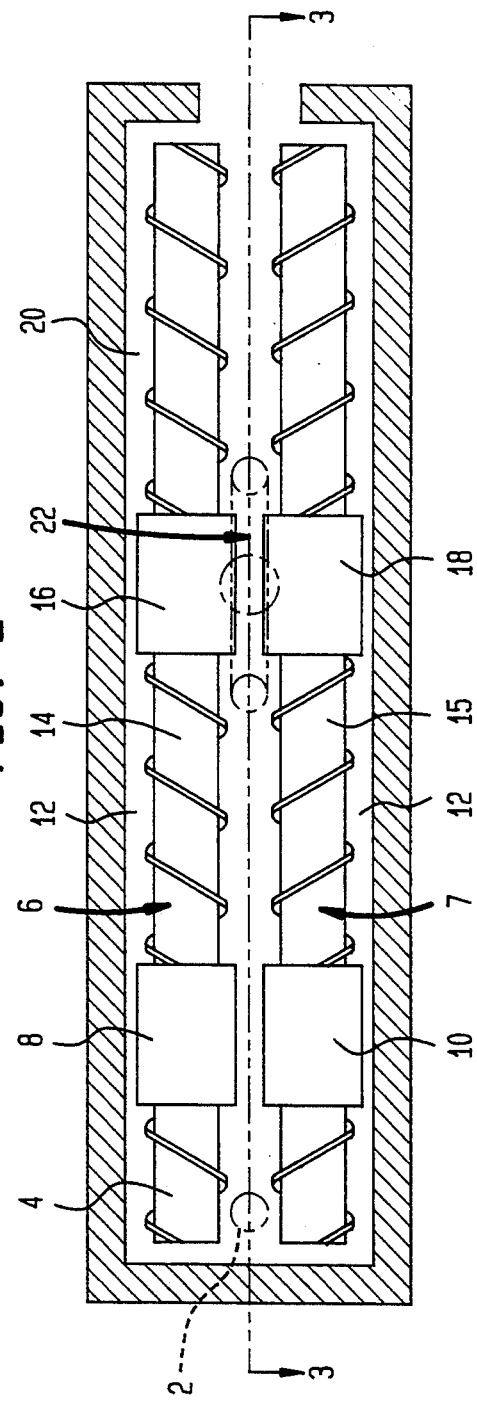

5,358,681

BACKSEAL EXTRUDER

This invention relates to an apparatus for working material. More particularly, this invention relates to a non-intermeshing, co or counter rotating twin screw extruder wherein leakage of pressure is minimized between a high pressure region in the extruder and an adjacent region of lower pressure.

BACKGROUND OF THE INVENTION

In an apparatus for working a material, usually referred to as an extruder, the extruder may be of the type wherein twin co or counter rotating non-intermeshing screws are disposed within a barrel bore. The extruder is generally divided into sections or zones for the performance of different operations. For example, there is a feed section wherein material fed into the extruder is conveyed into a second section which may be a mixing section or a section wherein a reaction takes place. Sectioning is generally achieved, especially in those instances which require zones of differing pressures, by the placement of flow restriction means between the zones. Many tinges, it is necessary to have the reaction section under a positive pressure in order to promote the reaction of materials. Thereafter, the reacted materials are then passed to an area of lower pressure wherein undesirable liquids and volatiles are released from the reaction mixture. The construct of the extruder is such that between the barrel bores, wherein the screws are placed, there is a channel or opening which may function as a conduit for the undesired liquids.

One way in which the pressure is maintained in the reaction section is to have a flow restriction means on each screw between the high pressure zone and a low pressure zone. The material being treated will flow against this restriction means thereby creating substantial back pressure. The magnitude of this back pressure determines the pressure differential between the upstream high pressure zone and the downstream low pressure zone. Unfortunately, because of the channel between the barrel bores, there is considerable pressure leakage between the high pressure zone and the low pressure zone. This leakage diminishes the capacity of the restrictions on the screws to maintain a pressure differential between the high and low pressure zones.

This pressure leakage results in the material in the high pressure zone being at a pressure which is not as great as desired. In some reactions, conducted within a high pressure zone, because of the pressure leakage from the high pressure zone to the low pressure zone, raw material usage is greatly increased to obtain the amount of product which would have been obtained if the pressure in the high pressure zone could have been maintained at a constant higher level.

U.S. Pat. No. 2,615,199 discloses a means for obtaining a high pressure when working a material in an extruder. However, US 2,615,199 fails to teach or suggest any means for preventing loss of pressure between a high pressure area and a low pressure area due to the channels between the barrel bores. These channels are generally referred to as the "nip" or "apex" between the barrel bores. In general, it is standard that the distance from one barrel bore center to the other barrel bore center is equal to the diameter of the barrel bore itself.

It is an object of this invention therefore to provide a means for maintaining a high back pressure in a non-intermeshing parallel or tangential co or counter rotating twin screw extruder.

Another object of this invention is to provide a process for processing material at a high pressure wherein pressure loss from a high pressure zone to an adjacent zone of lower pressure, is minimized.

Still another object of this invention is to provide a device which allows for the continuous adjustment of a pressure drop over a flow restricting means in a non-intermeshing, co or counter rotating twin screw extruder.

A further object of this invention is to provide a device which will enable the operator to establish a higher pressure drop between adjacent extruder zones than may be achieved in conventional barrel sections.

Other objects and advantages will become apparent from the following more complete description and claims.

A BRIEF DESCRIPTION OF THE DRAWINGS

FIG. 1 is a top sectional view of an extruder according to this invention.

FIG. 2 is a top sectional view of another embodiment of an extruder according to this invention.

SUMMARY OF THE INVENTION

Figure 3:
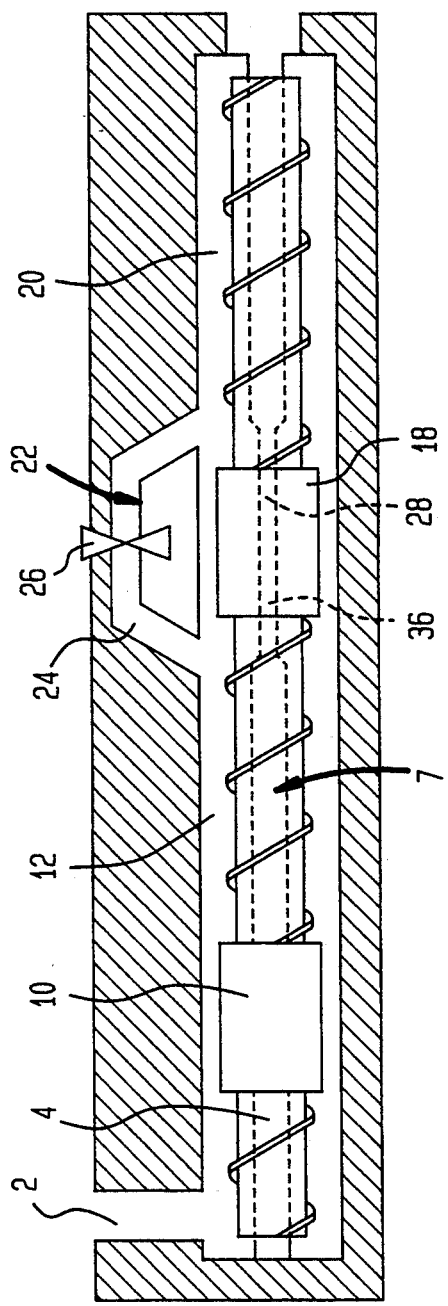
FIG. 3 is a cross-sectional view along the line 3—3 of FIG. 2 showing an externally operated pressure control means and a bypass channel.
Figure 4:
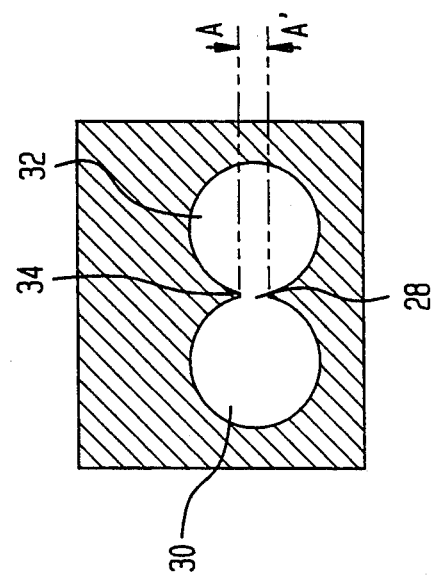
FIG. 4 is an end view along the line 4—4 of FIG. 1, showing only the barrel bores, extruder housing and the nip.

Broadly, this invention contemplates an apparatus for treating material fed therein comprising a housing having two congruent bores extending through said housing, an inlet extending through said housing and into at least one of said congruent bores, a pair of non-intermeshing parallel or tangential co or counter rotating twin screws, each disposed within one of said bores, means connected operably to said screws for turning said screws, said screws having flow restricting means disposed on each of said screws, said bores having a nip region, said nip region being defined by the ratio of the height between a pair of imaginary parallel lines, said lines being parallel to a plane defined by the center lines of the bores, one of which imaginary lines would touch the top of the nip and the other of which would touch the bottom of the nip divided by the bore diameter, said ratio being equal to or less than 0.38, and an outlet in said apparatus for discharging material fed to and worked in said apparatus.

This invention also contemplates a process for treating material in an extruder comprising the steps of introducing material into the reaction or mixing zone of an extruder having twin non-intermeshing co or counter rotating screws arranged parallel or tangential to one another and flow restriction means separating the mixing or reaction zone from a lower pressure zone downstream of the flow restricting means, adjusting the pressure in the reaction or mixing zone independent of the pressure in said reaction or mixing zone, moving material at an adjusted pressure from the reaction or mixing zone into the lower pressure zone and discharging material from said extruder through a discharge outlet.

DETAILED DESCRIPTION

Material is introduced into the extruder through the inlet 2. The feed section 4 of the screws 6 and 7 then convey the material past each of the flow restricting means 8 and 10 into a screw reaction or mixing zone 12. The material is worked in the reaction or mixing zone 12 by the mixing or reaction screw sections 14 and 15 under a desired temperature and pressure. The mixing or reaction screw sections 14 and 15 convey the materials toward flow restricting means 16 and 18 which create a back pressure. Pressure leakage from the reaction or mixing zone 12 is minimized due to the close tolerances of the flow restricting means with the walls of the barrel bores (not shown). Pressure leakage is also minimized due to the elimination or reduction of the nip or apex region between the barrel bores. When material is conveyed past the flow restricting means 16 and 18 and into a downstream screw section 20, the pressure drop between the reaction or mixing section 12 and the downstream section 20 is much greater than if the nip or apex had not been substantially reduced. The pressure drop between the reaction or mixing section 12 and the downstream section 20 may be adjusted, if desired, by providing a bypass means 22 to bypass the melt seals provided by the flow restricting means 16 and 18. The bypass means 22 is controlled by an operator and may be operated independent of any conditions, such as temperature or pressure, which may exist upstream of the extruder section 20 in which material is discharged from the bypass channel.

Referring now to FIG. 3, when the bypass valve 26 is fully closed, the entire fluid stream is forced past the melt seal created by the flow restricting means 18 (16 not shown) connected to the screws 7 (6 not shown) causing a very high back pressure, depending upon fluid viscosity, rate and the design of the screws 7 (6 not shown). The bypass valve 26 may be located at the entrance, exit or middle of the bypass channel 24, its location being based on convenience of the process.

When the bypass valve 26 of the bypass means 22 is fully opened, the pressure drop through the bypass channel 24 is typically very low, allowing the vast majority of the fluid melt to move through the bypass channel 24 of the bypass means 22 to the downstream section 20 rather then over the flow restricting means 18. When the bypass means 22 is fully closed, all the process fluid is forced across the melt seal created by the flow restricting means 18, such as a compounder, connected to the screw 7 and the flow of fluid material advanced by the screw 7 in the mixing or reaction zone 12 against the flow restricting means 18 such as a compounder. This results in a very high pressure drop between the reaction or mixing zone 12 and the downstream or outlet zone 20. Adjustment of the bypass means valve 26 between the fully opened and fully closed positions results in a proportionate split of the process fluid through the bypass channel 24 and past the flow restricting means 16 and 18. When the bypass means valve 26 is fully opened, process material is encouraged to pass through the bypass channel 24 with a reduced pressure drop between sections 12 and 20. When the valve 26 is fully closed, the pressure drop between sections 12 and 20 is greater than if valve 26 is fully open. Adjustment of the valve 26 between the fully opened and fully closed position will result in pressure drops intermediate the pressure drop resulting from a fully closed position or a fully opened position.

Any flow restriction means may be used to create back pressure. For example, one may use a smooth cylinder, known as a compounder. Other flow restriction means may also be used such as a screw having reverse feed flights (not shown) to create the desired back pressure. Flow restriction means for extruders are well known in the art and the invention is not to be construed as limited to any particular flow restriction means.

The fluid upstream of the flow restricting means 16 and 18 is pressurized by the pumping action of the screws 6 and 7. Taking advantage of this pressure, the fluid is driven through a bypass channel 24 that diverts the flow of fluid from the region between the flow restricting means 16 and 18 and the barrel bore 30 and 32 and the channel 28 made by the nip. The diverted flow is conveyed through the bypass channel 24 from the upstream zone 12 to the downstream zone 20 by the pressure difference between the zones. The bypass channel 24 may be of any convenient cross sectional shape, but a circular design is preferred. The bypass channel 24 may be cut into the barrel thus being an integral part of the barrel or may flow external to the barrel. Any suitable bypass means may be used. Such alternative bypass means are apparent to one skilled in the art.

The bypass channel 24 can itself be fitted with a means, such as an externally operated valve 26, to adjust the proportion of the volume of fluid flowing through the bypass channel 24 to the volume of fluid flowing through the barrel bore 30 and 32 around and between the flow restricting means 16 and 18. This external adjustment allows the operator to adjust the pressure drop between the upstream and downstream zones independent of the screw and current operating conditions.

The nip 34 or apex between the barrel bores 30 and 32 is substantially reduced or eliminated in order to create a higher back pressure in the reaction or mixing zone 12 by reducing or eliminating the leakage through the nip 34 or apex from the reaction zone 12 into a zone of lower pressure 20 which is downstream of the reaction or mixing zone 12. The size of the nip 34 is defined by the ratio of the height between a pair of imaginary parallel lines, (A and A') said lines being parallel to a plane defined by the center lines of the bores, one of which imaginary lines would touch the top of the nip 34 and the other of which would touch the bottom of the nip 34. This height constitutes the numerator for determining the nip 34 ratio. The denominator for determining the nip ratio is determined by the diameter of the barrel bore.

In order to achieve the benefits of this invention, the nip ratio should be equal to or less than 0.38.

In order for the nip 34 or apex reduction to be effective in creating a greater back pressure, the reduction 36 (shown in phantom in FIG. 3) need only occur where the compounders 16 and 18 are located and need not exist along the entire length of the barrel bores 30 and 32. Further, it is effective in creating a greater back pressure when the reduced nip 34 is coextensive with a portion of the length of the compounder, such as one-fourth or less. It is preferred however that the length of the nip reduction be coextensive with the length of the compounder.

It is preferred however, that the nip ratio be from about 0.1 to about 0.38.

It is even more preferred that the nip ratio be from about 0.1 to about 0.25.

The bypass channel used in Examples 3, 4 and 5 has a circular cross section of 0.438 inch diameter. A quarter turn ball valve is used to vary the pressure drop between adjacent extruder sections. The valve trim is fitted with a circular hole of a diameter equal to the bypass channel diameter. A valve position of 0° is a fully closed valve and a valve position of 90° is a fully open valve. Valve positions intermediate 0° and 90° designate the degree to which the bypass valve is open. The relationship between flow area and valve position for Examples 3 through 5 is not linear.

The bypass valve construction used for Examples 7 and 9 through 12 is similar to that used for Examples 3 through 5 except that the valve trim is shaped to provide a linear relationship between the flow area and the valve position. The valve for Examples 7 and 9 through 12 also rotated from 0° to 90°. However, 0° reflects a fully open position and 90° reflects a fully closed position.

In order to more fully illustrate the nature of this invention and the manner of practicing the same, the following Examples are presented:

EXAMPLE 1

Comparative

The purpose of this example is to illustrate the pressure drop between high pressure zone and an adjacent zone when a conventional twin screw extruder is used.

In a 0.8 inch diameter non-intermeshing, counter-rotating twin screw extruder having a nip ratio of 0.384 is added a polyglutarimide melt having a weight average molecular weight of 140,000. The temperature in the reaction or mixing zone of the extruder is 275° C. The discharge and devolatization zone of the extruder is maintained under a vacuum. The zones are separated through the use of a 2.4 inch long, 0.805 inch diameter cylindrical compounder. The polyglutarimide melt is pumped past the cylindrical seal at a rate of 61 grams per minute and a screw speed of 300 rpm. The pressure drop over the compounder between the mixing or reaction zone and the discharge zone where devolatization takes place is measured using a Dynisco melt pressure probe located proximate the upstream edge of the compounder. A pressure drop of 250 psig/in of compounder length is recorded.

EXAMPLE 2

The procedure of Example 1 is repeated except that the nip ratio is 0.303. The pressure drop measured as in Example 1 between the reaction or mixing zone and the discharge zone is 667 psig/in of compounder length.

For Examples 3 through 5 a valve position of 0° is a fully closed valve and a valve position of 90° is a fully open valve.

EXAMPLE 3

The procedure of Example 2 is repeated except that the equipment used contains a bypass valve with a channel between the reaction or mixing zone and the discharge zone and the compounders used included a series, on each of the screws, of 3 connected smooth cylindrical compounders wherein the middle compounder is 1.4 inches long and 0.76 inch in diameter and each of the two end compounders are 0.8 inch long and 0.8 inch in diameter. The temperature used in the reaction zone is 280° C. and the material used is polymethylmethacrylate having a weight average molecular weight of 140,000. The rate of pumping past the compounder is 113 grams per minute. The screw speed used is 370 rpm. In Example 3, the bypass valve position is set at 20. The pressure drop, measured as in Example 1, is 240 psig/in. of compounder length.

EXAMPLE 4

The procedure of Example 3 is repeated except that the valve position used is 25. The pressure drop measured is 100 psig/in. of compounder length.

EXAMPLE 5

The procedure of Example 3 is repeated except that the valve position is 30. The pressure drop for Example 5 is 70 psig/in. of compounder length.

EXAMPLE 6

Comparative

In a two inch diameter non-intermeshing, counter-rotating twin screw extruder equipped with two compounders which have reverse flights having a 0.9 in. pitch and which are 6 inches long and 1.8 inches in root diameter is added a polyglutarimide melt having a weight average molecular weight of 90,000. The nip ratio used is 0.406. The temperature in the reaction or mixing zone is maintained at 262° C. The polyglutarimide melt is pumped past the reverse flight compounder at a rate of 383 lbs. per hour using a screw speed of 500 rpm. A pressure drop of 156 psig/in. of compounder length is measured.

For Examples 7 and 9 through 12 a valve position of 0° reflects a fully open position and a valve position of 90° reflects a fully closed position.

EXAMPLE 7

The procedure of Example 6 is repeated except that a bypass valve is present and is kept in a closed position so that there is no bypass of the compounder through the bypass channel. The nip ratio used is 0.29. A pressure drop of 256 psig/in. of compounder length is measured between the melt or reaction zone and the discharge or devolatization zone.

EXAMPLE 8

Comparative

The equipment of Example 6 is used for Example 8 (nip ratio of 0.406). The molecular weight of the polyglutarimide used is 140,000 weight average molecular weight. The polyglutarimide is pumped at a rate of 252 lbs. per hour. The temperature used in the reaction or mixing zone is 257° C. No bypass means is present. A pressure drop of 282 psig/in. of compounder length between the reaction or mixing zone and the discharge zone is measured.

EXAMPLE 9

The procedure of Example 8 is repeated except that a bypass means, which includes a bypass valve, is present. The bypass valve is maintained in a closed position. The nip ratio is 0.29. The pressure drop obtained from the reaction or mixing zone to the discharge zone is 525 psig/in. of compounder length.

EXAMPLES 10-12

The equipment and material of Example 7 is used. The flow rate is 252 lbs. per hour of polyglutarimide having a weight average molecular weight of 90,000. The temperature maintained in the reaction and mixing zone is 240° C. The following pressure drops between the reaction or mixing zone and the discharge or devolatization zone is obtained.

| EXAMPLE | BYPASS VALVE POSITION (degrees) | PRESSURE DROP (psig/in. of compounder length) |
|---|---|---|
| 10 | 86.2 | 280 |
| 11 | 83.7 | 213 |
| 12 | 81.2 | 193 |

While this invention has been described in terms of certain preferred embodiments and illustrated by means of specific examples, the invention is not be construed as limited except as set forth in the following claims.

We claim:

1. An apparatus for treating material fed therein comprising a housing having two congruent bores extending through said housing, an inlet extending through said housing and into at least one of said congruent bores, a pair of non-intermeshing parallel or tangential co or counter rotating twin screws, each disposed within one of said bores, means connected operably to said screws for turning said screws, said screws having flow restriction means disposed on each of said screws, said bores having a nip region, said nip region being defined by the nip ratio being the ratio of the height between a pair of imaginary parallel lines, said lines being parallel to a plane defined by the center lines of the bores, one of which imaginary lines would touch the top of the nip and the other of which would touch the bottom of the nip divided by the bore diameter, said ratio being from about 0.1 to about 0.38, said nip region defined by said nip ratio of from about 0.1 to about 0.38 being coextensive with at least a portion of the length of said flow restriction means, and an outlet in said apparatus for discharging material fed to and worked in said apparatus whereby a higher back pressure is created in the section of the extruder immediately preceding the section of the extruder having a nip ratio of from about 0.1 to about 0.38.

2. An apparatus according to claim 1, wherein the ratio is from about 0.1 to about 0.25.

3. An apparatus according to claim 1, wherein said apparatus has flow restricting means which defines a reaction or mixing zone upstream of the flow restriction means and a zone of lower pressure than the reaction or mixing zone downstream of the flow restricting means.

4. An apparatus according to claim 3, wherein there is present a pressure adjusting means which is independent of pressure and temperature conditions in the reaction or mixing zone.

5. An apparatus according to claim 4, wherein the pressure adjusting means is actuated external from the reaction or mixing zone.

6. An apparatus according to claim 3, wherein there is present a means to bypass the flow restricting means for the flow of material from the reaction zone to a zone of lower pressure than the pressure in the reaction zone.

7. A process for treating material in an extruder comprising the steps of introducing material into a reaction or mixing zone of an extruder having twin non-intermeshing co or counter rotating screws arranged parallel or tangential to one another and flow restriction means separating the mixing or reaction zone from a lower pressure zone downstream of the flow restriction means, adjusting the pressure in the reaction or mixing zone independent of the pressure in said reaction or mixing zone, maintaining the pressure in said reaction or mixing zone by maintaining a nip ratio of from about 0.1 to about 0.38 along at least part of the length of the flow restricting means, moving material from the reaction or mixing zone into the lower pressure zone and discharging material from said extruder through a discharge outlet.

8. A process according to claim 7, wherein material is moved from said reaction or mixing zone to said lower pressure zone by bypassing said flow restricting means.

9. A process according to claim 7, wherein said nip ratio is from about 0.1 to about 0.25.

* * * * *